(12) United States Patent
Kovalak et al.

(10) Patent No.: US 6,548,560 B1
(45) Date of Patent: *Apr. 15, 2003

(54) PROCESS FOR DEVULCANIZATION OF CURED RUBBERS

(75) Inventors: Ronald Roy Kovalak, Canal Fulton, OH (US); Lawrence Keith Hunt, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,541

(22) Filed: Mar. 29, 2000

(51) Int. Cl.$^7$ ............................ C08J 11/10; B02C 19/12
(52) U.S. Cl. ............................................. 521/41; 521/44
(58) Field of Search ........................... 521/40, 41, 44, 521/45.5

(56) References Cited

U.S. PATENT DOCUMENTS

| | | | | |
|---|---|---|---|---|
| 4,104,205 A | | 8/1978 | Novotny et al. | 260/2.3 |
| 5,284,625 A | | 2/1994 | Isayev et al. | 422/128 |
| 5,602,186 A | * | 2/1997 | Myers et al. | 521/41 |
| 5,798,394 A | * | 8/1998 | Myers et al. | 521/42.5 |
| 5,891,926 A | * | 4/1999 | Hunt et al. | 521/41 |

FOREIGN PATENT DOCUMENTS

GB    2350839 A  *  12/2000

* cited by examiner

*Primary Examiner*—Edward J. Cain
*Assistant Examiner*—Katarzyna Wyrozebski Lee
(74) *Attorney, Agent, or Firm*—Alvin T. Rockhill

(57) ABSTRACT

This invention is based upon the unexpected discovery that cured rubber can be devulcanized by heating it to a temperature of at least about 150° C. under a pressure of at least about $3.4 \times 10^6$ Pascals in the presence of a solvent selected from the group consisting of alcohols and ketones having a critical temperature within the range of about 200° C. to about 350° C. The molecular weight of the rubber can be maintained at a relatively high level if the devulcanization is carried out at a temperature of no more than about 300° C. This devulcanization technique does not significantly change the microstructure of the rubber. In other words, the devulcanized rubber can be recompounded and recured into useful articles in substantially the same way as was the original rubber. This invention more specifically discloses a process for devulcanizing cured rubber into devulcanized rubber that is capable of being recompounded and recured into useful rubber products, said process comprising (1) heating the cured rubber to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the cured rubber into the devulcanized rubber thereby producing a slurry of the devulcanized rubber in the solvent; and (2) separating the devulcanized rubber from the solvent.

20 Claims, No Drawings

PROCESS FOR DEVULCANIZATION OF CURED RUBBERS

BACKGROUND OF THE INVENTION

Millions of used tires, hoses, belts and other rubber products are discarded annually after they have been worn-out during their limited service life. These used rubber products are typically hauled to a dump because there is very little use for them after they have served their original intended purpose. A limited number of used tires are utilized in building retaining walls, as guards for protecting boats and similar things where resistance to weathering is desirable. However, a far greater number of tires, hoses and belts are simply discarded.

The recycling of cured rubber products has proven to be an extremely challenging problem. This problem associated with recycling cured rubber products (such as, tires, hoses and belts) arises because, in the vulcanization process, the rubber becomes crosslinked with sulfur. After vulcanization, the crosslinked rubber becomes thermoset and cannot be reformed into other products. In other words, the cured rubber cannot be melted and reformed into other products like metals or thermoplastic materials. Thus, cured rubber products cannot be simply melted and recycled into new products.

Since the discovery of the rubber vulcanization process by Charles Goodyear in the nineteenth century, there has been interest in the recycling of cured rubber. A certain amount of cured rubber from tires and other rubber products is shredded or ground to a small particle size and incorporated into various products as a type of filler. For instance, ground rubber can be incorporated in small amounts into asphalt for surfacing roads or parking lots. Small particles of cured rubber can also be included in rubber formulations for new tires and other rubber products. However, it should be understood that the recycled rubber serves only in the capacity of a filler because it was previously cured and does not co-cure to an appreciable extent to the virgin rubber in the rubber formulation.

Various techniques for devulcanizing cured rubber have been developed. Devulcanization offers the advantage of rendering the rubber suitable for being reformulated and recured into new rubber articles if it can be carried out without degradation of the rubber. In other words, the rubber could again be used for its original intended purpose. However, none of the devulcanization techniques previously developed have proven to be commercially viable.

U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur-sulfur bonds and insufficient to sever significant amounts of carbon-carbon bonds.

U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain levels of ultrasonic amplitudes in the presence of pressure and optionally heat, it is reported that cured rubber can be broken down. Using this process, the rubber becomes soft, thereby enabling it to be reprocessed and reshaped in a manner similar to that employed with previously uncured elastomers.

U.S. Pat. No. 5,602,186 discloses a process for devulcanizing cured rubber by desulfurization, comprising the steps of: contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate. U.S. Pat. No. 5,602,186 indicates that it is preferred to control the temperature below about 300° C., or where thermal cracking of the rubber is initiated. Toluene, naphtha, terpenes, benzene, cyclohexane, diethyl carbonate, ethyl acetate, ethylbenzene, isophorone, isopropyl acetate, methyl ethyl ketone and derivatives thereof are identified as solvents that can be used in the process disclosed by U.S. Pat. No. 5,602,186.

SUMMARY OF THE INVENTION

By utilizing the process of this invention, cured rubber can be devulcanized using a simple technique without the need for microwaves, ultrasonic waves or an alkali metal. In other words, the cured rubber can be devulcanized in the absence of microwaves, ultrasonic waves or an alkali metal, such as sodium, potassium, lithium, or cesium. The employment of the process of this invention also preserves the original microstructure of the rubber and allows for it to maintain a relatively high molecular weight. Thus, the process of this invention primarily breaks sulfur-sulfur bonds and/or carbon-sulfur bonds rather than carbon-carbon bonds.

This invention is based upon the unexpected discovery that cured rubber can be devulcanized by heating it to a temperature of at least about 150° C. under a pressure of at least about $3.4 \times 10^6$ Pascals in the presence of an organic solvent selected from the group consisting of alcohols and ketones having a critical temperature which is within the range of about 200° C. to about 350° C. The molecular weight of the rubber can be maintained at a relatively high level if the devulcanization is carried out in the presence of the organic solvent at a temperature of no more than about 300° C. This devulcanization technique does not significantly change the microstructure of the rubber and it can accordingly be used in the same types of applications as was the original rubber. In other words, the devulcanized rubber can be recompounded and recured into useful articles in substantially the same way as was the original rubber.

This invention more specifically discloses a process for devulcanizing cured rubber into devulcanized rubber that is capable of being recompounded and recured into useful rubber products, said process comprising (1) heating the cured rubber to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the cured rubber into the devulcanized rubber thereby producing a slurry of the devulcanized rubber in the solvent; and (2) separating the devulcanized rubber from the solvent.

This invention also reveals a process for devulcanizing cured rubber into devulcanized rubber that is capable of being recompounded and recured into useful rubber products, and for extracting the devulcanized rubber from the cured rubber, said process comprising (1) heating the cured rubber to a temperature which is within the range of about 150° C. to about 300° C. under a pressure of at least about $3.4 \times 10^6$ Pascals in a solvent selected from the group consisting of alcohols and ketones, wherein said solvent has a critical temperature which is within the range of about 200° C. to about 350° C., to devulcanize the cured rubber into the devulcanized rubber thereby producing a mixture of solid cured rubber, solid devulcanized rubber and a solution of the devulcanized rubber in the solvent, (2) removing the solution of the devulcanized rubber from the solid cured rubber and the solid devulcanized rubber, (3) cooling the solution of the devulcanized rubber in the solvent to a temperature of less than about 100° C. and (4) separating the devulcanized rubber from the solvent.

DETAILED DESCRIPTION OF THE INVENTION

Virtually any type of sulfur-cured rubber can be devulcanized by utilizing the process of this invention. For instance, it can be used to devulcanize natural rubber, synthetic polyisoprene rubber, polybutadiene rubber, styrene-butadiene rubber, isoprene-butadiene rubber, styrene-isoprene rubber, styrene-isoprene-butadiene rubber, bromobutyl rubber, chlorobutyl rubber and the like. The technique of this invention can also be used to devulcanize blends of various types of rubbers.

The devulcanization process of this invention can be carried out by simply heating the cured rubber in the presence of an alcohol solvent or a ketone solvent to a temperature of at least about 150° C. under a pressure of at least about $3.4 \times 10^6$ Pascals (Pa). It is critical for the alcohol or the ketone used as the solvent to have a critical temperature that is within the range of about 200° C. to about 350° C. It is preferred for the alcohol or the ketone used as the solvent to have a critical temperature that is within the range of about 250° C. to about 320° C. The term "critical temperature" as used herein is defined as the temperature above which the gas of a compound (the alcohol or the ketone) cannot be liquefied by the application of pressure. Some representative examples of alcohols that can be used include methanol, ethanol, allyl alcohol, 1-propanol, isopropyl alcohol, n-butanol, iso-butanol, 2-butanol, tert-butanol, 1-pentanol, 2-methyl-1-butanol, 3-methyl-1-butanol, 3-methyl-2-butanol, 2,2-dimethyl-1-propanol, and 1-hexanol. Some representative examples of ketones that can be used include acetone, methyl ethyl ketone, methyl n-propyl ketone, methyl isopropyl ketone, methyl isobutyl ketone, and diethyl ketone. Mixtures of such alcohols and ketones can be utilized as the solvent.

To increase the rate of the devulcanization process, the cured rubber will typically be cut, milled or ground to a relatively small particle size. It is normally preferred for the temperature to be no more than about 300° C. to minimize the level of polymer degradation. In other words, if the devulcanization process is conducted at a temperature of no more than about 300° C., the sulfur-sulfur and/or carbon-sulfur bonds in the cured rubber can be broken preferentially to the carbon-carbon bonds in the rubber. Thus, by carrying out the devulcanization process at a temperature of 300° C. or less, the molecular weight of the rubber can be maintained at a high level. For this reason, the devulcanization process will typically be conducted at a temperature that is within the range of about 150° C. to about 300° C.

It is normally preferred for the devulcanization process to be carried out at a temperature which is within the range of about 200° C. to about 280° C. The most preferred devulcanization temperatures are within the range of about 230° C. to about 260° C. The pressure employed will typically be within the range of about $3.4 \times 10^6$ Pascals (500 lbs/in2) to about $3.4 \times 10^7$ Pascals (5000 lbs/in2). It is normally preferred to utilize a pressure which is within the range of about $6.9 \times 10^6$ Pascals (1000 lbs/in2) to about $2.8 \times 10^7$ Pascals (4000 lbs/in2). It is generally most preferred to utilize a pressure which is within the range of about $1.7 \times 10^7$ Pascals (2500 lbs/in2) to about $2.4 \times 10^7$ Pascals (3500 lbs/in2). It is normally preferred for the cured rubber being devulcanized to be emersed in a bath of the alcohol or ketone solvent. In any case, it is important to protect the devulcanized rubber from oxygen during the process. In some cases, it will be desirable to conduct the process under an inert gas atmosphere, such as nitrogen.

After the devulcanization has been completed, the devulcanized rubber is separated from the alcohol or ketone solvent. Since the devulcanized rubber is somewhat soluble in the alcohol or ketone at elevated temperatures, the separation will typically be carried out at a temperature of less than about 100° C. The devulcanized rubber can be recovered from the alcohol or ketone solvent utilizing conventional techniques for separating solids from liquids. For instance, the devulcanized rubber can be recovered from the alcohol or ketone solvent and other solid residue (such as, carbon black, silica and metals) by decantation, filtration, centrification and the like.

Since the devulcanized rubber is somewhat soluble in alcohols and ketones at high temperatures, it is possible to extract the devulcanized rubber from cured rubber and other solid residue using alcohol or ketone as the solvent. This involves (1) heating the cured rubber to a temperature which is within the range of about 150° C. to about 300° C. under a pressure of at least about $3.4 \times 10^6$ Pascals in the alcohol or ketone solvent to devulcanize the cured rubber into the devulcanized rubber thereby producing a mixture of solid cured rubber, solid devulcanized rubber, in most cases additional solid residue, such as fillers (carbon black, silica, clay, and the like) and/or metals, and a solution of the devulcanized rubber in the solvent, (2) removing the solution of the devulcanized rubber from the solid cured rubber and the solid devulcanized rubber, (3) cooling the solution of the devulcanized rubber in the solvent to a temperature of less than about 100 C and (4) separating the devulcanized rubber from the solvent.

The devulcanized rubber made by the process of this invention can be recompounded and recured into useful rubber products, such as tires, hoses and belts. The weight average molecular weight of the rubber can be maintained at a high level of over 100,000 and typically over 150,000. In some cases, a weight average molecular weight of over 200,000 can be maintained. The devulcanization technique of this invention does not significantly change the microstructure of the rubber and it can accordingly be used in the same types of applications as was the original rubber. In other words, the devulcanized rubber can be recompounded and recured into useful articles in substantially the same way as was the original rubber.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1–10

In this series of experiments, cured styrene-butadiene rubber (SBR) containing 23.5 percent bound styrene was devulcanized in a various alcohols, including methanol, ethanol, 1-butanol, 1-propanol, 2-propanol, 2-butanol, isobutyl alcohol, 4-methyl-2-pentanol and 1-pentanol. The alcohol was injected into a Hewlett-Packard 5890A gas chromatograph at a pressure of $2.1 \times 10^7$ Pascals (3000 lbs/in2) with an ISCO LC-5000 syringe pump. The Hewlett-Packard 5890A gas chromatograph was not used in the capacity of a chromatographic instrument. The chromatograph was used solely to provide a temperature controllable environment. In other words, the chromatograph was used in the capacity of a heating oven. The sample vessel in the gas chromatograph contained about 0.55 grams of cured SBR samples which were devulcanized and extracted by the alcohol that passed through the sample vessel which was inline with an all-metal flow path.

In the procedure used, the SBR samples were initially heated to a temperature of 150° C. and maintained at that temperature under static conditions for 10 minutes in the alcohol which was, of course, under the pressure of $2.1 \times 10^7$ Pascals (3000 lbs/in2). Then, the alcohol was allowed to flow through the system at a flow rate of 1–2 ml per minute at a temperature of 150° C. for 20 minutes with the alcohol exiting the chromatograph being collected and the amount of devulcanized SBR that was extracted being measured.

Then, the temperature of the sample chamber was increased to 200° C. and was maintained at that temperature under static conditions for 10 additional minutes with the alcohol still being maintained at a pressure of $2.1 \times 10^7$ Pascals (3000 lbs/in2). Then, the alcohol was again allowed to flow through the system at a flow rate of 1–2 ml per minute at a temperature of 200° C. for 20 minutes with the alcohol exiting the chromatograph being collected and with the amount of devulcanized SBR that was extracted being measured.

Then, the temperature of the sample chamber was increased to 250° C. and was maintained at that temperature under static conditions for 10 additional minutes with the alcohol being maintained at a pressure of $2.1 \times 10^7$ Pascals (3000 lbs/in2). Then, the alcohol was again allowed to flow through the system at a flow rate of 1–2 ml per minute at a temperature of 250° C. for 20 minutes with the alcohol exiting the chromatograph being collected and with the amount of devulcanized SBR extracted by the alcohol being measured.

Finally, the temperature of the sample chamber was increased to 300° C. and was maintained at that temperature under static conditions for 10 additional minutes with the alcohol being maintained at a pressure of $2.1 \times 10^7$ Pascals (3000 lbs/in2). Then, the alcohol was again allowed to flow through the system at a flow rate of 1–2 ml per minute at a temperature of 300° C. for 20 minutes with the alcohol exiting the chromatograph being collected and with the amount of devulcanized SBR extracted by the alcohol being measured.

The cumulative percentage of devulcanized SBR that was extracted from the cured SBR sample with each of the alcohols evaluated at 150° C., 200° C., 250° C. and 300° C. is reported in Table I. Example 2 is a repeat of Example 1.

TABLE I

| Example | Alcohol | 150° C. | 200° C. | 250° C. | C300° C. |
| --- | --- | --- | --- | --- | --- |
| 1 | 2-butanol | 38% | 82% | 90% | 93% |
| 2 | 2-butanol | 40% | 70% | 85% | 92% |
| 3 | methanol | 2% | 3% | 4% | 7% |
| 4 | ethanol | 2% | 4% | 9% | 20% |

TABLE I-continued

| Example | Alcohol | 150° C. | 200° C. | 250° C. | C300° C. |
| --- | --- | --- | --- | --- | --- |
| 5 | 1-propanol | 3% | 16% | 43% | 69% |
| 6 | 2-propanol | 2% | 7% | 13% | 25% |
| 7 | 1-butanol | 4% | 19% | 57% | 86% |
| 8 | isobutyl alcohol | 2% | 10% | 44% | 74% |
| 9 | 1-pentanol | 3% | 11% | 42% | 89% |
| 10 | 4-methyl-2-pentanol | 2% | 11% | 33% | 68% |

As can be seen from Table I, all of the alcohols evaluated caused devulcanization to occur. However, 2-butanol was far better than any of the other alcohols evaluated. It was particularly superior at lower temperatures. In fact, at 200° C., it extracted at least 70 percent of the SBR and, at 250° C., it extracted at least 85 percent of the SBR. The utilization of lower temperatures is, of course, desirable because less polymer degradation occurs at lower temperatures. The devulcanized SBR samples that were extracted were determined to have the same microstructure as the original SBR samples.

EXAMPLES 11–18

In this series of experiments, the general procedure utilized in Examples 1–10 was repeated except that temperature was held constant at 250° C. and the alcohol was allowed to flow continuously at a rate of 1–2 ml per minute for 20 minutes at pressure. In this series of experiments, 2-butanol was used exclusively as the alcohol for the devulcanizations. Cured SBR samples that contained no filler, carbon black, silica or a combination of carbon black and silica were devulcanized and extracted with the 2-butanol. The SBR had an original weight average molecular weight of about 400,000. The weight average molecular weights of the devulcanized SBR samples recovered are reported in Table II.

TABLE II

| Example | Filler | Molecular Weight* |
| --- | --- | --- |
| 11 | no filler | 181,000 |
| 12 | no filler | 186,000 |
| 13 | silica | 244,000 |
| 14 | silica | 293,000 |
| 15 | carbon black | 197,000 |
| 16 | carbon black | 216,000 |
| 17 | carbon black/silica | 177,000 |
| 18 | carbon black/silica | 177,000 |

*The molecular weights reported are weight average molecular weights.

As can be seen from Table II, the technique of this invention could be used to devulcanize rubber samples that contained silica, carbon black or a combination of silica and carbon black. Table II also shows that the devulcanization technique of this invention did not greatly reduce the molecular weight of the rubber. Thus, the devulcanization procedure of this invention destroyed sulfur-sulfur bonds and/or carbon-sulfur bonds without destroying a significant number of carbon-carbon bonds in the rubber.

EXAMPLE 19

In this experiment a cured rubber composition containing 50 phr (parts per 100 parts of rubber) of SBR, 50 phr of polyisoprene rubber, and 50 phr of carbon black was devulcanized by utilizing the general procedure described in Examples 1–10 with methyl ethyl ketone being employed as the solvent. In these experiments the temperature was further increased to 350° C. and finally 400° C. The cumulative percentage of devulcanized rubber that was extracted from the cured rubber sample at 150° C., 200° C., 250° C., 300° C., 350° C., and 400° C. is reported in Table III.

TABLE III

| Temperature | Amount of Rubber Extracted |
|---|---|
| 150° C. | 5% |
| 200° C. | 19% |
| 250° C. | 57% |
| 300° C. | 75% |
| 350° C. | 93% |
| 400° C. | 96% |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for devulcanizing cured rubber into devulcanized rubber, said process comprising (1) heating the cured rubber to a temperature which is within the range of about 150° C. to about 300° C. under a pressure of at least about 3.4×10$^6$ Pascals in the presence of a solvent selected from the group consisting of alcohols and ketones, wherein said solvent has a critical temperature which is within the range of about 200° C. to about 350° C., to devulcanize the cured rubber into the devulcanized rubber thereby producing a slurry of the devulcanized rubber in the solvent, and (2) separating the devulcanized rubber from the solvent.

2. A process as specified in claim 1 wherein said process is conducted in the absence of alkali metals.

3. A process as specified in claim 2 wherein the slurry of the devulcanized rubber is cooled to a temperature of less than about 100° C. before the devulcanized rubber is separated from the solvent.

4. A process as specified in claim 2 wherein step (1) is carried out at a pressure which is within the range of about 3.4×10$^6$ Pascals to about 3.4×10$^7$ Pascals and wherein step (1) is carried out at a temperature which is within the range of about 200° C. to about 280° C.

5. A process as specified in claim 2 wherein step (1) is carried out at a pressure which is within the range of about 6.9×10$^6$ Pascals to about 2.8×10$^7$ Pascals and wherein step (1) is carried out at a temperature which is within the range of about 230° C. to about 260° C.

6. A process as specified in claim 2 wherein step (1) is carried out at a pressure which is within the range of about 1.7×10$^7$ Pascals to about 2.4×10$^7$ pascals.

7. A process as specified in claim 2 wherein said solvent is an alcohol.

8. A process as specified in claim 2 wherein said solvent is a ketone.

9. A process as specified in claim 7 wherein said alcohol is selected from the group consisting of methanol, ethanol, allyl alcohol, 1-propanol, isopropyl alcohol, n-butanol, isobutanol, 2-butanol, tert-butanol, 1-pentanol, 2-methyl-1-butanol, 3-methyl-1-butanol, 3-methyl-2-butanol, 2,2-dimethyl-1-propanol, methyl isobutyl ketone, and 1-hexanol.

10. A process as specified in claim 8 wherein said ketone is selected from the group consisting of acetone, methyl ethyl ketone, methyl n-propyl ketone, methyl isopropyl ketone, and diethyl ketone.

11. A process as specified in claim 8 wherein said ketone is methyl ethyl ketone.

12. A process as specified in claim 1 wherein the cured rubber is comprised of natural rubber.

13. A process as specified in claim 1 wherein the cured rubber is comprised of polybutadiene rubber.

14. A process as specified in claim 1 wherein the cured rubber is comprised of styrene-butadiene rubber.

15. A process as specified in claim 1 wherein the cured rubber is comprised of bromobutyl rubber.

16. A process as specified in claim 1 wherein the cured rubber is comprised of chlorobutyl rubber.

17. A process for devulcanizing cured rubber into devulcanized rubber, said process comprising (1) heating the cured rubber to a temperature which is within the range of about 150° C. to about 300° C. under a pressure of at least about 3.4×10$^6$ Pascals in a solvent selected from the group consisting of alcohols and ketones, wherein said solvent has a critical temperature which is within the range of about 200° C. to about 350° C., to devulcanize the cured rubber into the devulcanized rubber thereby producing a mixture of solid cured rubber, solid devulcanized rubber and a solution of the devulcanized rubber in the solvent, (2) removing the solution of the devulcanized rubber from the solid cured rubber and the solid devulcanized rubber, (3) cooling the solution of the devulcanized rubber in the solvent to a temperature of less than about 100° C. and (4) separating the devulcanized rubber from the solvent.

18. A process as specified in claim 17 wherein step (1) is carried out at a pressure which is within the range of about 3.4×10$^6$ Pascals to about 3.4×10$^7$ Pascals and at a temperature which is within the range of about 200° C. to about 280° C.

19. A process as specified in claim 17 wherein said process is conducted in the absence of alkali metals.

20. A process as specified in claim 19 wherein step (1) is carried out at a pressure which is within the range of about 6.9×10$^6$ Pascals to about 2.8×10$^7$ Pascals and at a temperature which is within the range of about 230° C. to about 260° C.

* * * * *